United States Patent
Fuchs et al.

(10) Patent No.: US 11,260,567 B2
(45) Date of Patent: Mar. 1, 2022

(54) METHOD FOR PRODUCING A PLASTIC MOLDED ARTICLE, PLASTIC MOLDED ARTICLE AND MOLD

(71) Applicants: LEONHARD KURZ Stiftung & Co. KG, Furth (DE); BOND-Laminates GmbH, Brilon (DE)

(72) Inventors: Michael Fuchs, Furth (DE); Christian Schumacher, Furth (DE); Martin Hahn, Herrieden (DE); Felix Wolf, Rosstal (DE); Steffen Falgner, Nuremberg (DE); Thomas Komenda, Oberasbach (DE); Andy Dentel, Paderborn (DE); Jochen Bauder, Deutschnofen (IT); Arthur Rieb, Brilon (DE)

(73) Assignees: LEONHARD KURZ STIFTUNG & CO. KG, Fürth (DE); BOND-LAMINATES GMBH, Brilon (DE)

( * ) Notice: Subject to any disclaimer, the term of this patent is extended or adjusted under 35 U.S.C. 154(b) by 446 days.

(21) Appl. No.: 15/736,910

(22) PCT Filed: Jun. 9, 2016

(86) PCT No.: PCT/EP2016/063142
§ 371 (c)(1),
(2) Date: Dec. 15, 2017

(87) PCT Pub. No.: WO2016/202672
PCT Pub. Date: Dec. 22, 2016

(65) Prior Publication Data
US 2018/0370096 A1   Dec. 27, 2018

(30) Foreign Application Priority Data
Jun. 16, 2015 (DE) .......................... 102015109597.1

(51) Int. Cl.
  B29C 45/14   (2006.01)
  B32B 7/12    (2006.01)
  (Continued)

(52) U.S. Cl.
  CPC ........ B29C 45/14811 (2013.01); B29C 33/12 (2013.01); B29C 37/0028 (2013.01);
  (Continued)

(58) Field of Classification Search
  CPC .......... B29C 43/184; B29C 2043/5816; B29C 45/14336; B29C 70/76; B29C 70/302
  See application file for complete search history.

(56) References Cited

U.S. PATENT DOCUMENTS 4,643,789 A * 2/1987 Parker ................. B29C 37/0025
                                                156/219
5,506,029 A * 4/1996 Hara ................. B29C 45/14786
                                                428/120
(Continued)

FOREIGN PATENT DOCUMENTS

DE   4120133    12/1992
DE   19731903   1/1999
(Continued)

OTHER PUBLICATIONS

Jeng, M.-C., et al., Rapid mold temperature control in injection molding by using steam heating, International Communications in Heat and Mass Transfer, vol. 37 (2010), pp. 1295-1304. (Year: 2010).*
(Continued)

*Primary Examiner* — Matthew J Daniels
(74) *Attorney, Agent, or Firm* — Hoffmann & Baron, LLP

(57) ABSTRACT

A method for producing a decorated plastic molded article with the steps:
a) providing a base body made of a fiber composite plastic
(Continued)

b) providing a decorative film;
c) heating the base body;
d) joining the base body and the decorative film in a mold.

18 Claims, 5 Drawing Sheets

(51) Int. Cl.
| | | |
|---|---|---|
| B29C 37/00 | (2006.01) | |
| B29C 33/12 | (2006.01) | |
| B32B 7/04 | (2019.01) | |
| B32B 27/36 | (2006.01) | |
| B29C 43/18 | (2006.01) | |
| B32B 7/06 | (2019.01) | |
| B32B 27/42 | (2006.01) | |
| B32B 27/40 | (2006.01) | |
| B32B 27/08 | (2006.01) | |
| B32B 27/30 | (2006.01) | |
| B32B 5/02 | (2006.01) | |
| B32B 27/32 | (2006.01) | |
| B32B 23/04 | (2006.01) | |
| B32B 1/00 | (2006.01) | |
| B32B 9/02 | (2006.01) | |
| B32B 27/12 | (2006.01) | |
| B32B 7/08 | (2019.01) | |
| B29C 45/04 | (2006.01) | |
| B29C 45/73 | (2006.01) | |
| B29C 59/02 | (2006.01) | |
| B29C 43/20 | (2006.01) | |
| B29C 33/14 | (2006.01) | |
| B29L 31/00 | (2006.01) | |
| B32B 37/06 | (2006.01) | |
| B32B 37/24 | (2006.01) | |

(52) U.S. Cl.
CPC ........ *B29C 43/184* (2013.01); *B29C 45/0416* (2013.01); *B29C 45/14065* (2013.01); *B29C 45/14786* (2013.01); *B29C 45/73* (2013.01); *B32B 1/00* (2013.01); *B32B 5/022* (2013.01); *B32B 5/024* (2013.01); *B32B 5/026* (2013.01); *B32B 7/04* (2013.01); *B32B 7/06* (2013.01); *B32B 7/08* (2013.01); *B32B 7/12* (2013.01); *B32B 9/02* (2013.01); *B32B 23/04* (2013.01); *B32B 27/08* (2013.01); *B32B 27/12* (2013.01); *B32B 27/302* (2013.01); *B32B 27/308* (2013.01); *B32B 27/32* (2013.01); *B32B 27/322* (2013.01); *B32B 27/36* (2013.01); *B32B 27/365* (2013.01); *B32B 27/40* (2013.01); *B32B 27/42* (2013.01); *B29C 33/14* (2013.01); *B29C 37/0025* (2013.01); *B29C 43/203* (2013.01); *B29C 59/02* (2013.01); *B29C 2037/0042* (2013.01); *B29K 2995/002* (2013.01); *B29L 2031/722* (2013.01); *B32B 37/06* (2013.01); *B32B 37/24* (2013.01); *B32B 2255/10* (2013.01); *B32B 2255/26* (2013.01); *B32B 2260/021* (2013.01); *B32B 2260/046* (2013.01); *B32B 2262/06* (2013.01); *B32B 2262/101* (2013.01); *B32B 2262/106* (2013.01); *B32B 2264/00* (2013.01); *B32B 2274/00* (2013.01); *B32B 2307/4023* (2013.01); *B32B 2307/4026* (2013.01); *B32B 2307/412* (2013.01); *B32B 2307/732* (2013.01); *B32B 2307/748* (2013.01); *B32B 2405/00* (2013.01); *B32B 2451/00* (2013.01)

(56) References Cited

U.S. PATENT DOCUMENTS

| | | | | |
|---|---|---|---|---|
| 5,759,594 | A | * | 6/1998 | Masui .................. B29C 51/145 425/510 |
| 7,419,713 | B2 | * | 9/2008 | Wilkens .................. B32B 27/04 428/68 |
| 9,221,219 | B2 | * | 12/2015 | Frederiksen ........ B29C 66/1142 |
| 2005/0227080 | A1 | | 10/2005 | Horsting et al. |
| 2008/0143016 | A1 | | 6/2008 | Yu |
| 2008/0211137 | A1 | | 9/2008 | Schilles |
| 2010/0304170 | A1 | * | 12/2010 | Frederiksen .......... B29C 66/721 428/542.8 |
| 2012/0156445 | A1 | | 6/2012 | Schmidt et al. |
| 2015/0202807 | A1 | | 7/2015 | Sano et al. |

FOREIGN PATENT DOCUMENTS

| | | |
|---|---|---|
| DE | 19819304 | 11/1999 |
| DE | 10309811 | 10/2003 |
| DE | 102004059696 | 6/2006 |
| DE | 102009016177 | 10/2010 |
| DE | 102010063751 | 6/2012 |
| DE | 102013004962 | 3/2014 |
| EP | 2740579 | 6/2014 |
| EP | 3040177 | 7/2016 |
| JP | S5638222 | 4/1981 |
| JP | H0732465 | 2/1995 |
| JP | H0768997 A | 3/1995 |
| JP | H0797465 | 4/1995 |
| JP | 2001219455 A | 8/2001 |
| JP | 2004058650 A | 2/2004 |
| JP | 2012531335 | 12/2012 |
| JP | 2013046978 | 3/2013 |
| JP | 201469565 A | 4/2014 |
| JP | 2015160393 A | 9/2015 |
| TW | 201136740 | 11/2011 |
| TW | 201518092 | 5/2015 |
| WO | WO9403337 | 2/1994 |
| WO | WO2015023000 A1 | 2/2015 |

OTHER PUBLICATIONS

Japanese Office Action dated Sep. 24, 2019.
Japanese Office Action for corresponding Japanese Patent Application No. 2018-517477, pp. 1-15 (dated Jan. 22, 2019).

* cited by examiner

METHOD FOR PRODUCING A PLASTIC MOLDED ARTICLE, PLASTIC MOLDED ARTICLE AND MOLD

This application claims priority based on an International Application filed under the Patent Cooperation Treaty, PCT/EP2016/063142, filed Jun. 9, 2016, which claims priority to DE102015109597.1, filed Jun. 16, 2015.

BACKGROUND OF THE INVENTION

The invention relates to a method for producing a plastic molded article, a plastic molded article obtainable in this way as well as a mold for use in such a method.

Fiber composite plastics are versatilely and flexibly usable and, through the choice of the fiber type and structure as well as the matrix material, can be adapted optimally in terms of their mechanical properties to loading conditions occurring for a respective component and usually make thinner and/or lighter components possible compared with many other materials with identical performance.

In many cases, however, fiber composite plastics have an optically unappealing and/or, for particular application cases, insufficiently mechanically and/or chemically resistant surface quality. In edge areas, fiber composite plastic components routinely have still open edges and/or protruding fibers after shaping. Therefore, they are usually used for structural components that are not visible or they have to be subjected to further expensive processing steps.

Known methods for coating the surfaces of fiber composite components usually include multiple filling and varnishing steps and are therefore elaborate and expensive to carry out.

SUMMARY OF THE INVENTION

The object of the present invention is to provide an improved method for producing coated plastic molded articles, such an improved plastic molded article as well as a mold that can be used in such a method.

This object is achieved by a method according to claim 1, a plastic molded article according to claim 26 and a mold according to claim 60.

For clarification, it may be noted that all definitions and parameters that are listed, general or named in preferred ranges in any desired combinations are included.

By decorative film is meant a dry varnish system consisting of at least one varnish layer, which is applied to carrier film beforehand for the purpose of the process-integrated surface coating of the plastic molded article to be produced. The dry varnish system is capable, under the action of a specific pressure, temperature and time profile, of forming an adhesive join with the plastic molded article by adhesion and/or material bonding, and of thus coating it with decorative and/or functional surface features over the whole surface or at least in selected areas. The term decorative film in the present invention therefore comprises the development of the at least one dry varnish layer both as a so-called transfer system, wherein a carrier film is detachable from a transfer ply applied to the plastic part after the processes of film application and shaping of the plastic molded part, and as a so-called laminating system, in which a residue of the carrier film, in particular together with further varnish layers, is provided on the surface of the molded part. With the latter, further possibilities present themselves, such as for instance the utilization of the carrier film as surface protection as well as for a "second surface" decoration, i.e. the arrangement of the decorative layers between plastic molded article and carrier film.

In the following, irrespective of a macroscopic shaping, by forming or molding is also meant any type of movement of plastic matrix which is necessary in excess of the purpose of the shaping of a two- or three-dimensional plastic molded part in order to provide the latter with improved surface properties out of the mold. The matrix mobility is generated by the action of temperature and/or application of pressure geared to the respective matrix plastic, based on the fact that the plastic matrix is brought into a flowable and thus moldable state. A better surface quality of the plastic molded part can thereby be generated. This is preferably defined by the fact that the surface of the fiber composite semi-finished product, which is by low- and high-matrix and thus fundamentally marked by unevennesses, is smoothed by a matrix distribution achieved in the process according to the invention at least such that it is optically greatly improved compared with surfaces of known drape molding processes.

Such a method for producing a plastic molded article according to the invention comprises the steps:

a) providing at least one base body based on at least one fiber composite plastic;
b) providing at least one decorative film;
c) heating the at least one base body;
d) joining the at least one base body and the at least one decorative film in a mold.

A plastic molded article with at least one base body made of a fiber composite plastic and at least one decorative film which forms or covers at least one area of the surface of the plastic molded article is thus obtained.

It is particularly advantageous if, in step d), a joint forming of the base body with the decorative film in the mold is provided. This joint forming can be effected simultaneously or, alternatively, the decorative film is first preformed by suction against an inside of the mold and then the base body is formed further together with the decorative film by closing the mold.

Particularly suitable for carrying out the described method is a mold for producing a plastic molded article, with a first mold half and at least one second mold half, between which, in the closed state, a cavity is formed which is complementary to a shape of the plastic molded article, wherein at least one area of the surface of the mold facing the cavity can be formed, when the mold is closed, as a forming surface for forming at least one base body inserted into the mold and at least one decorative film inserted into the mold, and wherein a partial area of the cavity can be formed as a mold cavity for back-injection molding over the whole surface with one or more plastic compounds or injection of at least one plastic element onto the formed base body or overmolding of at least one edge area of the formed base body.

In this way, a plastic molded article is obtained which combines the excellent mechanical properties of fiber composite plastics with an appealing and/or functionalizable surface design that is improved via decorative films and their design and/or functional features. Due to the heat introduced during the heating and forming, in combination with an application of pressure, the at least one decorative film is simultaneously joined to the at least one base body, with the result that a separate work step for this can advantageously be dispensed with.

As, in the same cycle, the mold also allows the overspraying, but also the back-injection molding or overmolding as well as the injection of further plastic elements, structures made of polymeric molding compounds can additionally be introduced into the plastic molded article, which would be impossible to realize by simple forming of the at least one base body.

Furthermore, the method makes a more efficient utilization of the materials possible by already providing the at least one base body close to the contours. Through the integration of at least two of the process steps forming, injection molding of functional elements and surface coating into a single manufacturing step by means of the mold, it is furthermore possible to save energy and processing time.

The described method additionally offers further advantages over conventional varnishing and varnish-spraying methods for surface finishing of fiber composite plastics. These are usually linked to a multi-step method sequence in which several varnishing steps are effected, for example a cathodic dip coating (CDC), the application of filler, base coat and clear coat. The single-step processing within the framework of the described method or by means of the described mold results in a particularly gentle process, as a repeated heating of the plastic molded article and/or application of pressure due to individual shaping and coating processes is avoided. This also improves the quality and reliability of plastic molded parts obtainable in such a way.

This also involves cost savings, not least because of a reduced materials usage compared with the state of the art, a reduced cycle time due to the single-step processing in the described mold and due to reduced component waste because the decorative film can already be checked for optical defects beforehand, in contrast to wet-varnishing methods.

It is preferred if the decorative film is provided as roll goods, and thus can be conveyed through the mold as a continuous material by means of defined film-feeding technology. This makes it easier to handle the decorative film, as the use of separate gripper tools or the like for inserting the decorative film into the mold can preferably be dispensed with according to the invention. This makes it possible to shorten the handling portions of the cycle time. In addition, it is advantageous that the decorative film can be held wrinkle-free by the pay-off and take-up reels of the roller and, where necessary, positioned register-accurate or positionally accurate.

By register accuracy or registration accuracy is meant a positional accuracy of two or more elements and/or layers relative to each other. The register accuracy is to vary within a predefined tolerance and to be as low as possible. At the same time, the register accuracy of several elements and/or layers relative to each other is an important feature in order to increase the process stability. The positionally accurate positioning can be effected in particular by means of sensorily, preferably optically detectable registration marks or register marks. These registration marks or register marks can either represent special separate elements or areas or layers or themselves be part of the elements or areas or layers to be positioned.

Alternatively, the decorative film can be processed by stamping or cutting out before the forming.

The decorative film can be completely severed and, in two dimensions, given a contour corresponding to the flat pattern of the desired final shape.

Alternatively, the decorative film can also be merely perforated and completely severed only in the mold.

It is possible for the decorative film to be applied to the base body before the forming, in particular by roll-to-roll embossing, calendering or compression molding.

This is advantageous in particular if the decorative film is first die-cut to the desired shape. If the application of the decorative film to the base body is effected before the heating, then the heating step can additionally be utilized to produce an adhesive or material-bonding join between the decorative film and the base body which hardens in the mold during a cooling of the plastic molded part to be produced. In the case of a decorative film previously fixed in such a way, separate holding elements for the decorative film in the mold can then be dispensed with, with the result that the handling of decorative film and base body is made easier or the advantageous coating of a plastic molded article is made possible even without a mold specially equipped for handling decorative films.

Alternatively, it is additionally possible for the decorative film to be first cut to size two-dimensionally in the mold by stamping such as is required by a contour corresponding to the flat pattern of the desired three-dimensional final shape.

It is further preferred if the at least one base body is provided as a semi-finished product in sheet form. Such semi-finished products, also called organo sheets, can be easily cut to the desired final contour, with the result that little material is lost during the cutting. Furthermore, semi-finished products in the form of sheet goods are particularly easy to handle and are therefore preferred. Organo sheets are light-weight and stiff sheets of semi-finished product made of a plastic matrix, in which long fibers or continuous fibers are embedded, partially or completely impregnated. While the fibers decisively determine the mechanical properties of the composite, such as strength and stiffness, the plastic matrix made of at least one plastic transfers the forces between the fibers, supports the fibers against bending and protects them from external attacks. The fibers can, on the one hand, be oriented in only one direction (unidirectional, e.g. as a tape), stand at right angles to each other in two directions (orthotropic or balanced), or be placed quasi-isotropically at any desired angle to each other. Continuous fibers have the advantage that they can be introduced into the plastic matrix greatly stretched with a high degree of orientation and thereby in larger quantities. On the other hand, they make the flow of forces between force transmission points inside organo sheets possible via the fibers alone, which increases the mechanical performance of a component based on such an organo sheet/semi-finished product. At least one thermoplastic is preferably used as the plastic.

Preferably, the at least one base body is heated by infrared irradiation, contact heating, in a convection oven or inside the mold. A uniform heating of the base body is hereby ensured in a simple and energy-efficient manner.

The at least one base body is preferably heated before the mold is closed. The heating can be effected either in the mold or outside the mold, preferably in the mold.

It is preferred if the at least one base body is heated to a temperature which is 0° C. to 100° C., preferably 10° C. to 50° C., higher than the melting point or glass-transition temperature of the plastic to be used for the matrix of the fiber composite plastic. This makes a reliable forming of the base body possible in the subsequent method step, and a uniform flow of the softened plastic matrix.

Further, it is advantageous if the at least one base body is heated to a temperature in the range of from 100° C. to 300° C., preferably to a temperature in the range of from 160° C. to 280° C., further preferably to a temperature in the range of from 200° C. to 250° C.

The precise temperatures are to be chosen according to the respective plastics, preferably thermoplastics, for the plastic matrix of the at least one base body.

Furthermore, it is advantageous if the at least one base body and the at least one decorative film are joined to each other at least in areas by hydraulic, pneumatic or electrical application of pressure between two halves of the mold. An exact control of pressure and degree of forming during the forming process is hereby made possible, with the result that a plastic molded article with high material and surface quality is obtained.

It is further preferred if the mold is temperature-controlled. This prevents the base body from cooling prematurely, in particular during the forming, which could lead to poor forming results. The temperature control can be effected before and/or during and/or after the forming.

It is preferred if the mold is heated isothermally to a temperature of from 40° C. to 180° C., preferably from 70° C. to 150° C., further preferably from 80° C. to 120° C.

Alternatively, the mold can be temperature-controlled variothermally, in particular with a temperature control in a range between 0K and 250K below the melting temperature of a polymer used, with a heating or cooling gradient of from 1K/s to 30K/s. In this variant, the temperature control can be adapted to the forming process, with the result that contraction and distortion or a deterioration of the surface quality, for example through irregular shrinkage/contraction or expansion of the plastic molded part, can be prevented.

It is further preferred if the at least one decorative film is positioned register-accurate in the mold with the aid of registration marks applied to the decorative film and/or stamped marks introduced into the decorative film. For this, a sensor connected to the process control is preferably used to detect the marks. An exact relative position between decorative film and base body is hereby ensured, which is necessary in order to apply decorative motifs that can optionally be provided over the decorative film register-accurate to the base body and to prevent waste due to incorrect positioning.

Furthermore, it is advantageous if the at least one base body and/or the at least one decorative film are fixed in the mold by clamping devices and/or vacuum. A shifting or slipping of base body and/or decorative film in the mold is thus prevented, with the result that the desired positioning is preserved. Such holding means furthermore make it possible, in the case of horizontal molds, to position the base body or the decorative film in the upper mold half or, in the case of perpendicular molds, to ensure a secure hold of the base body or the decorative film in each of the mold halves.

It is particularly preferred if, in a further step e), at least one plastic structure is molded onto the plastic molded article over the whole surface, partially or circumferentially by injection molding. The molding can be or comprise injection molding, in particular back-injection molding and/or injection and/or overmolding. Additional structure elements can hereby be realized, which cannot be generated by the forming alone. Furthermore, it is thus possible to overmold edge areas of the at least one base body, with the result that inorganic or organic reinforcing fibers that are exposed or only become exposed due to the forming can be enclosed by the plastic structure. A plastic molded article with particularly smooth edges is hereby provided.

It is furthermore advantageous if, during the forming, a surface structure is introduced into the at least one base body and/or into the plastic structure and/or into the at least one decorative film at least in areas. This can be effected by a corresponding die plate in the mold. If the inner surface of one of the mold halves is formed, for example, from unpolished tool steel, a matted surface can be generated. Other structures, such as for example tactilely perceptible reliefs or the like, can also be generated by a mold with the corresponding negative structure in the forming surface.

It is preferred if the injection molding is effected at a temperature in the range of from 200° C. to 320° C., preferably in the range of from 240° C. to 290° C., further preferably in the range of from 240° C. to 270° C.

Furthermore, it is advantageous if the injection molding is effected at a pressure in the range of from 10 bar to 2000 bar, preferably in the range of from 200 bar to 1500 bar, further preferably in the range of from 500 bar to 1300 bar.

Pressure and temperature of the injection-molding process are geared to the type of plastic compound used, as well as the geometry of the plastic structure to be generated.

It is particularly preferred if the injection molding is effected in the mold. Preferably, steps d) and e) in this case are carried out combined.

An additional injection mold can hereby be dispensed with. This reduces both the outlay on equipment and the production time and costs.

Alternatively, it is furthermore possible for the injection molding to be effected in a separate injection mold.

In this variant, for example, existing injection molds can be used further.

It is furthermore preferred if the plastic molded article, after the forming and/or after the injection molding, is cooled to a temperature in the range of from 150° C. to 0° C., in particular with a cooling rate of from 1K/s to 30K/s.

A controlled solidification of the injected plastic structure or of the entire plastic molded article is hereby achieved, with the result that distortions or the like during cooling are prevented.

Further, it is preferred if, after the forming and/or after the injection molding, a carrier ply is detached from the decorative film. Such a carrier ply can protect the decorative film during the processing, with the result that a particularly good surface quality is achieved. Optionally, it is also possible to detach the carrier ply only during the final processing of the plastic molded part, for example only after its incorporation.

It is advantageous if a decorative film with a carrier ply made of PET with a thickness of from 5 µm to 250 µm, preferably from 12 µm to 50 µm, is used.

It is furthermore preferred if the at least one base body has at least one sheet material ply made of continuous fibers and/or long fibers and optionally short fibers in a thermoplastic plastic matrix.

Preferably, the at least one sheet material ply is a fabric and/or a scrim and/or a mat and/or a non-woven material and/or knitted fabrics and/or nettings and/or unidirectionally aligned sheet materials such as for example UD tapes (UD=unidirectional).

Inorganic materials, in particular silicate or non-silicate glasses, carbon, boron, aramid, silicon carbide, metals, metal alloys, metal oxides, metal nitrides, metal carbides and silicates, as well as organic materials, in particular natural or synthetic polymers, preferably polyesters, polyamides and natural fibers, in particular cotton or cellulose as well as combinations thereof, are preferably used as fiber materials.

The reinforcing fibers to be used are preferably at least 10 mm long to continuous reinforcing fibers, wherein the latter can be present as individual fibers, rovings, strands, yarns, twines or ropes.

The individual filaments preferably have diameters in the range of from 0.5 µm to 25 µm.

By continuous reinforcing fibers is meant those that generally a length of over 50 mm, but especially those with a length which approximately corresponds to the longitudinal extent of the respective composite materials.

In an embodiment, however, combinations of different fiber materials can also be used.

Such sheet material plies give the at least one base body the desired mechanical properties. Their structure can be adapted to loads to be expected of the plastic molded article, with the result that the latter has the optimal strength and/or stiffness for real loading conditions.

The sheet material plies do not form any layers separate from the plastic matrix, but are permeated by it, with the result that fibers and plastic form an integral component.

In particular, it is advantageous if the at least one sheet material ply is or comprises a fabric and/or a scrim and/or a mat and/or a non-woven material made of glass fibers and/or carbon fibers and/or aramid fibers and/or natural fibers.

Depending on the application case, different fiber materials and different types of sheet material plies can be freely combined with each other in order to create a respectively optimized structure of the plastic molded article.

Preferably, the at least one sheet material ply has an areal weight in the range of from $5 \text{ g/m}^2$ to $3000 \text{ g/m}^2$, preferably in the range of from $100 \text{ g/m}^2$ to $900 \text{ g/m}^2$, particularly preferably in the range of from $150 \text{ g/m}^2$ to $400 \text{ g/m}^2$.

Furthermore, it is advantageous if the base body has at most 100 sheet material plies, preferably 2 to 40 sheet material plies, particularly preferably 2 to 10 sheet material plies.

Here too, the choice of the number of sheet material plies is made according to the loading conditions to be expected and according to the desired layer thickness of the base body.

It is expedient if the at least one base body has a material thickness in the range of from 0.05 mm to 6 mm, preferably in the range of from 0.1 mm to 2 mm, particularly preferably in the range of from 0.5 mm to 1.5 mm, with a fiber content by volume in the range of from 25% to 85%, preferably in the range of from 35% to 65%, particularly preferably in the range of from 45% to 55%.

The plastic matrix of the fiber composite plastic contains, as essential constituent, at least one plastic, preferably at least one thermoplastic. At least one thermoplastic is preferably selected from the group of polyolefins, vinyl polymers, polyacrylates, polyamides, polyurethanes, polyureas, polyimides, polyesters, polyethers, polystyrenes, polyhydantoins, polyphenylene oxides, polyarylene sulfides, polysulfones, polycarbonates, PMMA, SAN, TPO, TPU and POM.

Preferred vinyl polymers are to be selected from the group polyvinyl halides, polyvinyl esters, polyvinyl ethers.

Preferred polyamides are to be selected from the group PA 66, PA 6 and PA 12.

Particularly preferably, at least one thermoplastic is selected from the group PA 66, PA 6, PA 12, PPA, PP, PPS, TPU and PC for the plastic matrix of the fiber composite plastic.

Quite particularly preferably, at least one thermoplastic is selected from the group TPU, PA 6 and PC.

In particular preferably, at least one thermoplastic in flame-protected form is used for the plastic matrix of the fiber composite plastic. The thermoplastics can also be used in a wide variety of combinations with each other, preferably a combination of PC/ABS is used.

In a preferred embodiment, the at least one base body is covered by at least one layer, in particular at least one fiber-free plastic layer and/or a layer making an electrical function possible.

The properties of the plastic molded article can hereby be adapted further. Further plastic layers can optimize the mechanical properties of the base body. Functional layers can introduce additional functions, for example of an electronic or optical type, into the base body.

Preferably, the at least one covering layer contains the same plastic, preferably thermoplastics, as the at least one base body.

Preferably, the at least one decorative film comprises at least one varnish layer, in particular made of optionally radically crosslinked binders, e.g. acrylate, aziridine, polyurethane, polyester, polycarbonate, nitrocellulose or a mixture of these. Such a varnish layer represents the simplest possibility of realizing a decoration. The varnish layer can be transparent, translucent or opaque and in each case either colored or colorless. The varnish layer can be present over the whole surface or only partially. The varnish layer can generate both optical and non-optically active, technically functional effects.

In a particularly simple embodiment, this varnish layer can itself act as adhesive layer, thus can produce the join to the base body utilizing heat present or introduced in the process. The decorative film in this case would thus be only a single layer.

Preferably, the at least one varnish layer has a layer thickness of from 2 μm to 15 μm.

In a further preferred embodiment, the decorative film comprises at least one primer layer, in particular made of acrylate, PVC, chlorinated polyolefin or a mixture of these.

The primer layer preferably lies between a varnish layer and the base body. This can make it possible, for example, to apply varnish layers the materials of which are not compatible with the material of the base body such that they would be able to be adhesively joined to each other directly.

Preferably, the at least one primer layer has a layer thickness in the range of from 1 μm to 4 μm.

It is further preferred if the at least one primer layer and/or the at least one varnish layer comprises colorants, in particular multi-colored or achromatic pigments and/or effect pigments, thin-film layer systems, cholesteric liquid crystals, dyes and/or metallic or non-metallic nanoparticles.

Various decorations can hereby be realized. The colorants need not be present homogeneously in the respective layer, but can also vary over the extent of its surface and thus form motifs. The colorants of the varnish layer and primer layer can also supplement each other, with the result that complex designs can be realized.

It is preferred if the at least one varnish layer and/or the at least one primer layer has a pigmentation in the range of from 5% to 40%.

In a further preferred embodiment, the decorative film has at least one clear varnish layer, in particular with optionally radically crosslinked binders, e.g. acrylate, melamine, aziridine, polyurethane, polyester, polycarbonate, nitrocellulose or a mixture of these. In the finished plastic molded article, such a clear varnish layer preferably forms an outer surface and thus serves to seal the decorative film towards the outside, with the result that it is protected, for example, from mechanical or chemical influences.

Preferably, the at least one clear varnish layer has a layer thickness in the range of from 3 μm to 10 μm.

It is further preferred if the decorative film comprises a detachable carrier layer, in particular made of PET. During the processing of the decorative film, such a carrier layer forms its surface facing away from the base body and protects and stabilizes the decorative film during the processing. After completion of the plastic molded article or also only after its incorporation into its final installed position, the carrier layer can be removed and via this offers the possibility of transferring a thin-film packet on the dry varnish as a transfer ply to the molded part surface, with which the transfer ply can form an adhesive bond by adhesion and/or material bonding.

Preferably, the carrier layer has a layer thickness in the range of from 5 μm to 250 μm, preferably in the range of from 12 μm to 50 μm.

It is furthermore preferred if the decorative film comprises at least one detachment layer, in particular made of melamine, PE, carnauba, PTFE, cellulose.

Such a detachment layer is preferably arranged between the carrier ply and the further layers of the decorative film and allows the residue- and damage-free detachment of the carrier ply from them.

The at least one detachment layer preferably has a layer thickness in the range of from 0.5 μm to 3 μm.

It is further expedient if the decorative film comprises at least one adhesive layer, in particular made of acrylate, PVC, chlorinated polyolefin or a mixture of these.

The adhesive layer serves to join the decorative film to the base body and therefore forms a surface of the decorative film before the attachment of the decorative film to the base body. The material composition of the adhesive layer is geared to the material composition of the base body, with the result that, during the heating or forming, a solid join between decorative film and base body can form.

It is preferred if the at least one adhesive layer has a layer thickness in the range of from 1 μm to 5 μm.

Furthermore, it is expedient if the decorative film comprises at least one replication layer, in particular made of an acrylate, into which a surface relief is introduced.

Through replication layers with such relief structures, various optical, in particular optically variable, effects can be realized, but also functional effects such as for example tactile or haptic properties or also properties of receiving or repelling liquids. In particular, through differently formed structures of the replication layer, different gloss levels of the decorative film can be brought about, which range from high-gloss via mat-gloss to mat or glossy brushed structures. In particular, the mentioned brushed structures can have been introduced into the replication layer by means of replication, but also by means of special brushing tools.

Preferably, the at least one replication layer has a layer thickness in the range of from 0.3 μm to 3 μm, preferably in the range of from 0.5 μm to 1.5 μm.

It is expedient in particular if the surface relief of the at least one replication layer forms at least one optically variable element, in particular a hologram, Kinegram® or Trustseal®, a preferably linear or crossed sinusoidal diffraction grating, a linear or crossed single- or multi-step rectangular grating, a zero-order diffraction structure, an asymmetrical relief structure, a blazed grating, a preferably isotropic or anisotropic mat structure, or a light-diffracting and/or light-refracting and/or light-focusing micro- or nano-structure, a binary or continuous Fresnel lens, a binary or continuous Fresnel freeform surface, a microprism structure or a combined structure thereof.

Various appealing designs can hereby be realized, which are additionally difficult to imitate.

In a further preferred embodiment, the decorative film comprises at least one reflective layer, in particular made of a metal, preferably made of aluminum, silver, gold, chromium, tin or an alloy or an oxide thereof, and/or made of a material with a high refractive index, in particular made of ZnS or $TiO_2$.

Such layers can also be partially present and thus themselves form patterns or motifs. Furthermore, a reflective layer can also serve to make diffractive or refractive relief structures in a replication layer visible, or to improve their contrast, as well as to achieve defined gloss levels.

It is expedient if the at least one reflective layer has a layer thickness in the range of from 10 nm to 200 nm, preferably in the range of from 10 nm to 50 nm, particularly preferably in the range of from 15 nm to 35 nm.

Furthermore, it is preferred if the decorative film has at least one functional layer, in particular an electrical functional layer. For example, they can be functional layers which form electrical circuits such as antenna structures, coupling surfaces, LED-based display elements, touch sensor functions, shields against electromagnetic fields or the like. In addition to an appealing design, functional elements can thus also be integrated, with the result that such a plastic molded part can, for example, also be used as a control panel for a device.

In a particularly preferred embodiment, the plastic molded article comprises at least one plastic structure which, for mechanical stability reasons, can be back-injection molded over the whole surface or, for the functional integration of specific plastic elements, partially injected or also, for the smoothing and/or sealing, at least in areas, of edge areas, overmolded. Preferably, for this, the same plastic, preferably a thermoplastic, as is contained in the base body as essential component is used. A solid join between the plastic structure and the base body can hereby be ensured.

Alternatively, a thermoplastic can be used which is suitable to form an adhesive join with at least one of the thermoplastics contained in the base body. In a further embodiment, it can prove to be advantageous if the plastic structure is produced with at least two thermoplastics with different properties by means of injection-molding processes by combining the above-named techniques, back-injection molding, injection and overmolding, for example to realize a different coloring of particular areas of the plastic molded article or to integrate additional sealing elements on the plastic molded article.

Thermoplastics preferably to be used for the injection molding are selected from the group of polyolefins, vinyl polymers, polyacrylates, polyamides, polyurethanes, polyureas, polyimides, polyesters, polyethers, polystyrenes, polyhydantoins, polyphenylene oxides, polyarylene sulfides, polysulfones, polycarbonates, PMMA, SAN, TPO, TPU and POM.

Preferred vinyl polymers are to be selected from the group polyvinyl halides, polyvinyl esters, polyvinyl ethers.

Preferred polyamides are to be selected from the group PA 66, PA 6 and PA 12.

Particularly preferably, at least one thermoplastic is selected from the group PA 66, PA 6, PA 12, PPA, PP, PPS, TPU and PC for the injection molding.

Quite particularly preferably, at least one thermoplastic is selected from the group TPU, PA 6 and PC for the injection molding.

Structures can hereby be realized which cannot be created by the forming of the base body alone, as either the necessary degree of forming cannot be achieved or corresponding undercuts are not to be achieved by forming.

Furthermore, it is preferred if the material of the at least one plastic structure contains additives, in particular glass, carbon or natural fibers with preferred filling degrees in the range of from 20 m % to 60 m % (m %=mass percent), copper, aluminum oxide, graphite, agents for improving flowability, UV stabilizers, flame retardants, foamers, agents for dissipating static charge or for forming electrical conductivity pathways.

Such additives can give the plastic structure additional visual, mechanical, chemical or functional properties.

Furthermore, it is expedient if the material of the at least one plastic structure comprises colorants, in particular multi-colored or achromatic pigments and/or effect pigments, thin-film layer systems, cholesteric liquid crystals, dyes and/or metallic or non-metallic nanoparticles.

The plastic structure can thus also be optically adapted to the appearance of the remaining plastic molded article.

It is further preferred if the at least one plastic structure surrounds one or more edge areas of the at least one base body.

Protruding fibers, or fibers exposed by the forming, of the at least one base body can hereby be enclosed in the plastic structure, with the result that a smooth, optically and tactilely appealing edge of the plastic molded article results.

Furthermore, it is preferred if the at least one plastic structure comprises reinforcing elements, in particular ribbed bodies or domes, and/or securing elements, in particular clips, locking hooks, snap hooks, brackets, screw openings, locking openings, springs, grooves or the like.

This advantageously makes it possible to join the plastic molded article to further components, without separate securing means being necessary, and/or further contributes to the mechanical stabilization of the plastic molded article.

It is further preferred if at least one mold half of the injection mold has at least one runner for injecting an injection-molding compound into the mold cavity. This is preferably a hot runner or a cold runner. In a cold runner, the injection-molding compound solidifies and has to be removed with the finished plastic molded article and separated from it subsequently or already during the removal. In a hot runner, the injection-moldable plastic compound is heated, with the result that it does not solidify and remains in the mold. A later separation of the runner system from the workpiece can be dispensed with, but this solution is more expensive in terms of equipment and may require additional valves in the runner system.

It is further preferred if the at least one runner comprises an element that can be shifted relative to the cavity, by means of which it is possible to break through a partial area of the decorative film that protrudes beyond the base body. This makes it possible to inject the plastic compound also from sides of the decorative film into an area between decorative film and base body.

Furthermore, it is advantageous if at least one mold half has a holding device for the base body and/or the decorative film, in particular a clamping device and/or a suction device. Base body and decorative film can hereby be fixed in the mold, with the result that a reliable positioning of the respective parts is ensured.

In a further preferred embodiment, at least one mold half comprises a sealing element for sealing the cavity. This makes it possible to maintain a negative pressure or a vacuum in the cavity. On the one hand this can serve to fix the decorative film and/or the base body in the mold, on the other hand air bubbles impairing the optical quality during the forming process can also be prevented by an evacuation of the cavity.

Further, it is preferred if at least one mold half comprises a stamping device for separating and/or perforating a partial area of the decorative film. In this way, separate stamping tools can be dispensed with and the decorative film can be fed into the mold as roll goods. Preferably, the decorative film is then stamped to the desired shape when the mold halves are closed.

It is furthermore expedient if at least one mold half comprises a temperature-control device, in particular at least one temperature-control medium channel and/or at least one electrical temperature-control device, for temperature control of the materials introduced into the cavity. During the forming the temperature of the base body and/or during the injection molding the temperature of the plastic compound can hereby be suitably influenced, with the result that a premature cooling is prevented and a particularly good forming and primary forming quality is achieved.

In a further preferred embodiment, at least one mold half comprises at least one slide, which is movable relative to the mold cavity and can be inserted into it. Undercuts can hereby be realized in the injected plastic structure.

Further, it is preferred if at least one mold half comprises at least one ejector element, in particular an ejector pin, for ejecting the finished plastic molded part.

This makes a simple removal of the finished plastic molded article from the mold possible.

It is furthermore expedient if the mold comprises an electrical, hydraulic or pneumatic compression device, by means of which the mold halves can be moved towards each other and pressed against each other.

The individual force-generating elements of the compression device are advantageously controllable separately. The relative movement of the mold halves can hereby be controlled exactly and the contact pressure during the forming can be controlled precisely.

Further, it is preferred if drafts of the mold in the area of the forming surfaces have an angle of more than 2°.

It is also expedient if inside radii of the mold in the area of the forming surfaces are greater than a thickness of the base body.

Furthermore, the outside radii of the mold in the area of the forming surfaces are preferably greater than the sum of the inside radii of the mold in the area of the forming surfaces and the thickness of the base body.

It is likewise advantageous if the drafts of the mold in the area of the mold cavity have an angle of more than 0.5°. These geometric parameters make a problem-free demolding of the finished plastic molded article possible.

In a further preferred embodiment, the forming surface has an isotropic or anisotropic surface structure at least in areas. The appearance of the finished plastic molded article can hereby be controlled and, for example, a matted surface or specific tactile structures generated.

Furthermore, it is preferred if the mold comprises a conveyor for conveying the decorative film relative to the mold. This makes a particularly simple processing of the decorative film as roll goods possible, with the result that no additional grippers or the like are needed.

BRIEF DESCRIPTION OF THE DRAWINGS

The invention is now explained in more detail with reference to embodiment examples. There are shown in.

DETAILED DESCRIPTION OF THE PREFERRED EMBODIMENTS

Figure 1:
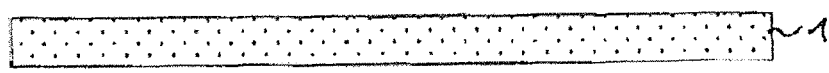
FIG. 1 a schematic sectional representation of a base body for producing an embodiment example of a plastic molded article.

To produce a coated, fiber-reinforced plastic molded article, at least one base body 1 made of a fiber-reinforced plastic is first provided. The at least one base body 1 comprises at least one sheet material ply made of continuous fibers and/or long fibers in a thermoplastic plastic matrix.

Such sheet material plies give the at least one base body 1 the desired mechanical properties. Their structure can be adapted to loads to be expected of the plastic molded article, with the result that the latter has the optimal strength and/or stiffness for real loading conditions.

The sheet material plies do not form any layers separate from the plastic matrix, but are permeated by it, with the result that fibers and plastic form an integral component.

In particular, it is advantageous if the at least one sheet material ply is or comprises a fabric and/or a scrim and/or a mat and/or a non-woven material made of glass fibers and/or carbon fibers and/or aramid fibers and/or natural fibers.

Depending on the application case, different fiber materials and different types of sheet material plies can be freely combined with each other in order to create a respectively optimized structure of the plastic molded article.

Preferably, the at least one sheet material ply has an areal weight of from 5 g/m² to 3000 g/m², preferably from 100 g/m² to 900 g/m², particularly preferably from 150 g/m² to 400 g/m².

Furthermore, it is advantageous if the at least one base body has at most 100 sheet material plies, preferably 2 to 40 sheet material plies, particularly preferably 2 to 10 sheet material plies.

Here too, the choice of the number of sheet material plies is made according to the loading conditions to be expected and according to the desired layer thickness of the base body 1.

The fiber plies used preferably have the same areal weight and are made of the same fiber type. However, combinations of different fiber materials can also be used. Preferred fiber materials are silicate and non-silicate glasses of a wide variety of types, carbon, boron, silicon carbide, metals, metal alloys, metal oxides, metal nitrides, metal carbides and silicates as well as different organic materials, preferably natural or synthetic polymers, preferably polyacryl nitrides, polyesters, ultra highly stretched polyolefin fibers, polyamides, polyimides, aramids, liquid crystal polymers, polyphenylene sulfides, polyether ketones, polyether ether ketones, polyetherimides, cotton and cellulose.

In an embodiment, carbon fiber fabric in the outer plies and glass fiber plies in the middle plies are combined. In addition, a combination of plies with different areal weights is also possible. In the case of such composites, a central symmetry is very important. Central symmetry within the meaning of the present invention means that the individual plies are dimensioned and arranged such that the optionally different mechanical properties as well as the optionally different, conditional on temperature, expansion and shrinkage behavior of the individual plies do not have the result that a plastic molded article produced flat in one plane warps under the action of temperature and becomes uneven or that a different stability depending on the bending direction could be measured along the same bending axis in the event of bending load on the component.

It is expedient if the at least one base body 1 has a material thickness in the range of from 0.05 mm to 6 mm, preferably in the range of from 0.1 mm to 2 mm, particularly preferably in the range of from 0.5 mm to 1.5 mm, with a fiber content by volume in the range of from 25% to 85%, preferably in the range of from 35% to 65%, particularly preferably in the range of from 45% to 55%.

Preferably, at least one thermoplastic in flame-protected form is used for the plastic matrix of the fiber composite plastic. The thermoplastics can also be used in a wide variety of combinations with each other, preferably a combination of PC/ABS is used. Combinations of the named plastics can also be used.

In a preferred embodiment, the base body 1 is covered by at least one layer, in particular at least one fiber-free plastic layer and/or a layer making an electrical function possible. The properties of the plastic molded article can hereby be adapted further. Further plastic layers can optimize the mechanical properties of the base body 1. Functional layers can introduce additional functions, for example of an electronic or optical type, into the base body 1.

Before the further processing, the base body 1 is impregnated and consolidated. The impregnation denotes the complete wetting of all fibers and the consolidation denotes the expressing of trapped air via the melt of the thermoplastic. The process of impregnation and consolidation is therefore dependent on the parameters temperature, pressure and time.

Preferably, "consolidated" within the meaning of the present invention means that an air portion of less than 10 volume-% is present in the fiber composite material.

The impregnation of the fibers depends on the viscosity of the plastic to be used, in particular thermoplastics. As thermoplastic melts generally have high viscosities, the impregnation of the fibers is dependent on high pressures and/or temperature and time.

To achieve optimal mechanical properties, in addition to a consolidation, as complete as possible an impregnation of the filaments with the thermoplastic of the matrix is necessary. Both properties can be measured by the determination of mechanical characteristic values, in particular the tensile strength. The tensile test, a quasi-static, destructive testing method, in the case of plastics according to ISO 527-4 or -5, is used to determine the tensile strength. Thermoplastic fiber composite materials preferably to be used therefore have tensile strengths in the range of from 250 to 2000 MPa according to ISO 527-4 or -5, depending on the fiber to be used.

In the fully impregnated and fully consolidated form, the fibers of the sheet material have the task of giving the base body 1 strength and stiffness, whereas the matrix, in contrast to the more brittle fibers, has a positive influence on the elongation at break of the entire composite. Through the different orientation of the fibers for example in the form of a fabric, special loading conditions can be counteracted (anisotropy). An isotropy can be achieved, for example, through the utilization of a random-fiber non-woven material.

Figure 2:
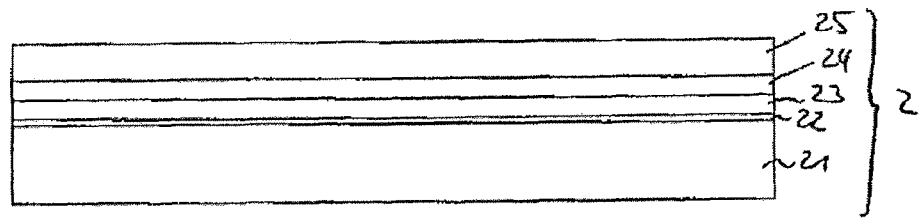
FIG. 2 a schematic sectional representation of a decorative film for producing an embodiment example of a plastic molded article.

In addition to the base body 1, a decorative film 2 is furthermore provided. An embodiment example of such a decorative film is shown in FIG. 2. The decorative film 2 comprises a carrier ply 21, a detachment layer 22, a protective layer 23, a decorative ply 24 and an adhesive layer 25. All layers, except for the decorative ply 24, are optional.

The carrier ply 21 is detachable from the decorative film and preferably consists of PET with a layer thickness in the range of from 5 μm to 250 μm, preferably in the range of from 12 μm to 50 μm. During the processing of the decorative film 2, such a carrier ply 21 forms its surface facing away from the base body 1 and protects and stabilizes the decorative film 2 during the processing. The carrier ply 21 can be removed after completion of the plastic molded article or also only after its incorporation into its final installed position.

In order to facilitate the detachment of the carrier ply 21, the detachment layer 22 is provided, which consists in particular of melamine, PE, carnauba, PTFE or cellulose and preferably has a layer thickness in the range of from 0.5 μm to 3 μm.

The protective layer 23 is preferably formed as a clear varnish layer, in particular made of optionally radically crosslinked binders, e.g. acrylate, melamine, aziridine, polyurethane, polyester, polycarbonate, nitrocellulose or a mixture of these.

In the finished plastic molded article, such a clear varnish layer preferably forms an outer surface and thus serves to seal the decorative film 2 towards the outside, with the result that it is protected, for example, from mechanical or chemical influences.

Preferably, the protective layer 23 has a layer thickness in the range of from 3 μm to 10 μm.

The decorative ply 24 forms the actual decoration for the plastic molded article. It can be constructed single- or multi-layered.

Preferably, the decorative ply 24 comprises at least one varnish layer, in particular optionally containing radically crosslinked binders, e.g. acrylate, aziridine, polyurethane, polyester, polycarbonate, nitrocellulose or a mixture of these. Such a varnish layer represents the simplest possibility of realizing a decoration.

In a particularly simple embodiment, this varnish layer can itself act as adhesive layer, thus can produce the join to the base body 1 when the latter is heated. The varnish layer of the decorative film 2 in this case would thus be only a single layer.

Preferably, the at least one varnish layer has a layer thickness in the range of from 2 μm to 15 μm.

In a further preferred embodiment, the decorative ply 24 comprises at least one primer layer, in particular made of optionally radically crosslinked binders, e.g. acrylate, PVC, chlorinated polyolefin or a mixture of these.

The primer layer preferably lies between the varnish layer and the base body 1. This can make it possible, for example, to apply varnish layers the materials of which are not compatible with the material of the base body 1.

Preferably, the at least one primer layer has a layer thickness in the range of from 1 μm to 4 μm.

It is further preferred if the at least one primer layer and/or the at least one varnish layer comprises colorants, in particular multi-colored or achromatic pigments and/or effect pigments, thin-film layer systems, cholesteric liquid crystals, dyes and/or metallic or non-metallic nanoparticles.

Various decorations can hereby be realized. The colorants need not be present homogeneously in the respective layer, but can also vary over the extent of its surface and thus form motifs. The colorants of the varnish layer and primer layer can also supplement each other, with the result that complex designs can be realized.

It is preferred if the at least one varnish layer and/or the at least one primer layer has a pigmentation in the range of from 5% to 40%.

Furthermore, it is expedient if the decorative ply 24 comprises at least one replication layer, in particular made of an acrylate, into which a surface relief is introduced.

Through replication layers with such relief structures, various optical, in particular optically variable, effects can be realized, but also functional effects such as for example tactile or haptic properties or also properties of receiving or repelling liquids.

Preferably, the at least one replication layer has a layer thickness in the range of from 0.3 μm to 3 μm, preferably in the range of from 0.5 μm to 1.5 μm.

It is expedient in particular if the surface relief of the at least one replication layer forms at least one optically variable element, in particular a hologram, Kinegram® or Trustseal®, a preferably linear or crossed sinusoidal diffraction grating, a linear or crossed single- or multi-step rectangular grating, a zero-order diffraction structure, an asymmetrical relief structure, a blazed grating, a preferably isotropic or anisotropic mat structure, or a light-diffracting and/or light-refracting and/or light-focusing micro- or nanostructure, a binary or continuous Fresnel lens, a binary or continuous Fresnel freeform surface, a microprism structure or a combined structure thereof.

Various appealing designs can hereby be realized, which are additionally difficult to imitate.

In a further preferred embodiment, the decorative ply 24 comprises at least one reflective layer, in particular made of a metal, preferably made of aluminum, silver, gold, chromium or an alloy thereof, and/or made of a material with a high refractive index, in particular made of ZnS or $TiO_2$.

Such layers can also be partially present and thus themselves form patterns or motifs. Furthermore, a reflective layer can also serve to make diffractive or refractive relief structures in a replication layer visible, or to improve their contrast.

It is expedient if the at least one reflective layer has a layer thickness in the range of from 10 nm to 200 nm, preferably in the range of from 10 nm to 50 nm, particularly preferably in the range of from 15 nm to 35 nm.

Furthermore, it is preferred if the decorative ply 24 has at least one functional layer, in particular an electrical functional layer. For example, they can be functional layers which form electrical circuits such as antenna structures, coupling surfaces, LED-based display elements, touch sensor functions, shields against electromagnetic fields or the like. In addition to an appealing design, functional elements can thus also be integrated, with the result that such a plastic molded part can, for example, also be used as a control panel for a device.

The adhesive layer 25 of the decorative film consists in particular of ABS, PC or a combination thereof and has a layer thickness in the range of from 1 μm to 5 μm.

The adhesive layer 25 serves to join the decorative film 2 to the base body 1 and therefore forms a surface of the decorative film 2 before the attachment of the decorative film 2 to the base body 1. The material composition of the adhesive layer 25 is geared to the material composition of the base body 1, with the result that, during the heating or forming, a solid join between decorative film 2 and base body 1 can form.

Figure 3:
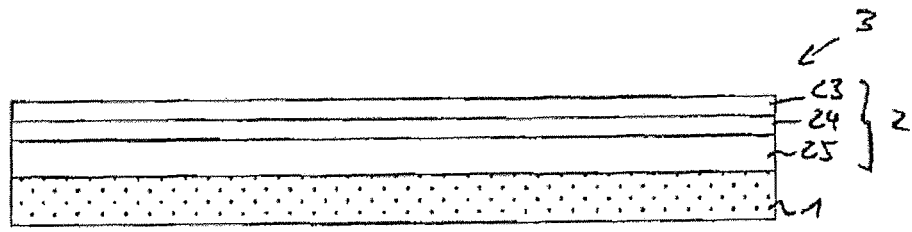
FIG. 3 a schematic sectional representation of an embodiment example of a plastic molded article with a base body according to FIG. 1 and a decorative film according to FIG. 2.

After the application of the decorative film 2 to the base body 1, both parts are solidly joined via the adhesive layer 25. The carrier ply 21 can now be detached, with the result that the finished plastic molded part 3 according to FIG. 3 results.

The embodiment example shown in FIG. 2 of the decorative film 2 is to be understood by way of example only. Other layer sequences and layer compositions are also possible, in particular multi-layered structures as well as structures in which individual layers are only partially applied.

In an alternative embodiment example, a pigmented varnish layer can simultaneously undertake the function of the adhesive layer. A separate protective layer is not provided here. Such a decorative film 2 is therefore not sufficiently abrasion-resistant for all applications.

For example, a varnish based on PVC, acrylate (and mixtures of these) with a layer thickness in the range of from 5 to 15 µm and a pigmentation in the range of from 30% to 75% can be used here. Preferably, such a decorative film 2 is applied to base body 1 based on ABS, ABS/PC, PC/ABS, PC, PP, PMMA, SAN, polystyrene, TPO, TPU, POM or PA.

In a further embodiment, a first color layer made of acrylate with a layer thickness of approx. 5 µm and a pigmentation of approx. 40% can be combined with a second color layer made of acrylate/PVC with a layer thickness of approx. 5 µm and a pigmentation of approx. 50%. The preferred substrate material for this is ABS.

Pigmented layers can also be dispensed with entirely. A transparent or also translucent (optionally translucently dyed) protective varnish layer 23 here simultaneously undertakes the function of the adhesive layer. A separate decorative ply 24 is not provided. The base body 1 would therefore be visible in each case through the decorative film 2.

A protective varnish layer 23 based on acrylate or polyurethane (or mixtures of these) with a layer thickness in the range of from 3 µm to 10 µm is preferred here. The preferred substrate material, thus the plastic matrix of the base body, here is ABS, ABS/PC, PC/ABS, PC, PMMA, SAN, polystyrene, TPO, TPU or POM.

A transparent protective varnish layer 23 can be combined with also at least one additional adhesive layer 25. At least one of the adhesive layers 25 is preferably (optionally translucently) dyed with pigments and/or dyes and simultaneously undertakes the function of the decorative layer.

The clear varnish layer 23 here consists of optionally radically crosslinked binders, e.g. acrylate, melamine, aziridine, polyurethane, polyester, polycarbonate, nitrocellulose and mixtures of these, with a layer thickness in the range of from 3 µm to 10 µm and no pigmentation.

An additional primer can consist of acrylate, PVC, chlorinated polyolefin (and mixtures of these) and preferably has a layer thickness in the range of from approx. 1 µm to 4 µm and a pigmentation in the range of from 5% to 35%.

The preferred matrix material here is ABS, ABS/PC, PC/ABS, PC, PP, PMMA, SAN, polystyrene, TPO, TPU, POM or PA.

In a further embodiment example, the detachment layer 22 consists of a PE/cellulose mixture with a layer thickness of approx. 0.5 µm. A first clear varnish layer consists of UV-curing melamine-crosslinked acrylate with a layer thickness of approx. 5 µm. A second clear varnish layer consists of UV-curing melamine-crosslinked acrylate with a layer thickness of approx. 1 µm. Furthermore, another primer made of PVC with a layer thickness of approx. 1 µm and a pigmentation of approx. 15% is provided here. The preferred substrate is ABS/PC.

Figure 4:
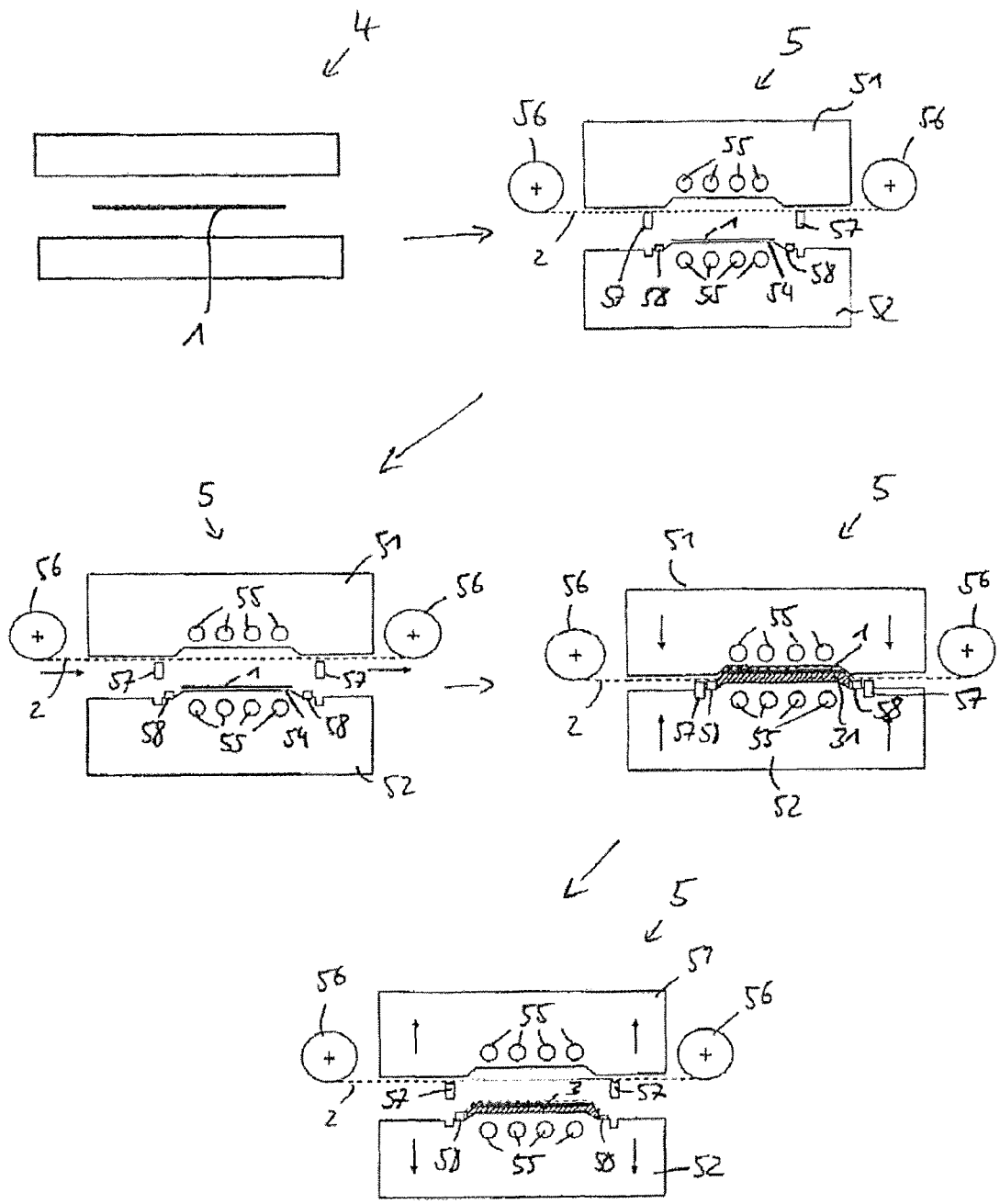
FIG. 4 a schematic representation of the method steps of an embodiment example of a method for producing a plastic molded article.

In FIG. 4, an embodiment example of a method for producing coated plastic molded articles 3 is represented.

Here, the base body 1 is first heated in a heating device 4. Preferably, this is effected by infrared irradiation, contact heating, in a convection oven or inside a mold 5 itself. A uniform heating of the base body 1 is hereby ensured in a simple and energy-efficient manner.

It is preferred if the base body 1 is heated to a temperature which is higher than the melting point of a plastic matrix of the fiber composite plastic by a range of from 0° C. to 100° C., preferably by a range of from 10° C. to 50° C. This makes a reliable forming of the base body possible in the subsequent method step, and a uniform flow of the softened plastic matrix.

Further, it is advantageous if the base body 1 is heated to a temperature in the range of from 100° C. to 300° C., preferably in the range of from 160° C. to 280° C., further preferably in the range of from 200° C. to 250° C. The precise temperatures are to be chosen according to the respective plastic matrix of the base body.

After the heating, the base body 1 is transferred into the mold 5. This can take place, for example, by means of an industrial robot which is provided with a gripper, a suction device or the like as manipulator.

The mold 5 comprises two mold halves 51, 52, which can be moved towards each other. The mold halves 51, 52 form forming surfaces 53, 54, which define the final contour of the formed base body 1. The arrangement of the mold halves 51, 52 with their forming surfaces 53, 54 can also be present in the reversed sequence, deviating from FIG. 4. Furthermore, the mold comprises temperature-control medium channels 55, by means of which the temperature of the mold halves can be adjusted.

By means of a feeding device 56, the decorative film 2 can be fed into the mold 5, where it can be fixed preferably to the mold half 51 or alternatively also to the mold half 52 by means of a clamp frame 57 or also by application of vacuum. Seals 58 seal the mold 5 in a vacuum-tight manner.

It is preferred if the decorative film 2 is positioned in the mold 5 with the aid of registration marks and/or stamped marks. An exact relative position between decorative film 2 and base body 1 is hereby ensured, with the result that waste because of incorrect positionings can be prevented.

After the base body 1 and the decorative film 2 have been inserted, the base body 1 and the decorative film 2 are formed by hydraulic, pneumatic or electrical application of pressure between the two mold halves 51, 52 of the mold 5. An exact control of pressure and degree of forming during the forming process is hereby made possible, with the result that a plastic molded article 3 with high material and surface quality is obtained.

In the case of utilization of a mold 5 with horizontally oriented mold-separation plane, i.e. vertically movable mold halves 51, 52 and positioning of the mold halves 51 underneath and of the mold half 52 above, the base body 1 can also be directly inserted in or placed on the mold half 51 when the decorative film 2 is guided against the mold half 51. The decorative film 2 in this variant can be arranged above the inserted base body 1 between the base body 1 and the mold half 52.

Preferably, the mold 5 is temperature-controlled during the forming via the temperature-control medium channels 55. This prevents the base body from cooling too quickly against the surface during the forming, which could lead to poor forming results.

It is preferred if the mold 5 is temperature-controlled during the forming isothermally to a temperature in the range of from 40° C. to 180° C., preferably in the range of from 70° C. to 150° C., further preferably in the range of from 80° C. to 120° C.

Alternatively, the mold 5 can be temperature-controlled variothermally during the forming, in particular with a temperature control from 0K to 250K below the melting temperature of the polymer, with a heating gradient of 1K/s 30K/s.

In this variant, the temperature control can be adapted to the forming process, with the result that distortions or a deterioration of the surface quality, for example through irregular shrinkage or expansion of the workpiece, can be prevented.

It is furthermore preferred if, during the forming, a surface structure is introduced into the base body 1 and/or the decorative film 2 at least in areas.

This can be effected by a corresponding die plate in the mold 5. If the inner surface of one of the mold halves 51, 52 is formed, for example, from unpolished tool steel, a matted surface can be generated. Other structures, such as for example tactilely perceptible reliefs or the like, can also be generated by a mold 5 with the corresponding negative structure in the forming surface.

After the forming, another plastic structure 31 can furthermore be back-injection molded over the whole surface or partially injected onto the plastic molded part 3 or the edge area can be overmolded in a sealing manner. For this, the mold comprises a runner system 59, which is not shown in FIG. 4. Examples of the design of the runner system are represented in FIGS. 5A and 5B.

Figure 5A:
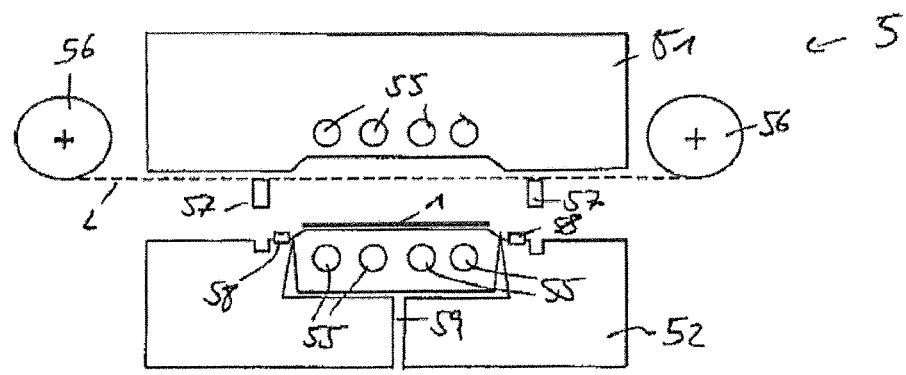
FIG. 5 a schematic representation of two embodiment examples of a mold for producing a plastic molded article.
Figure 5B:
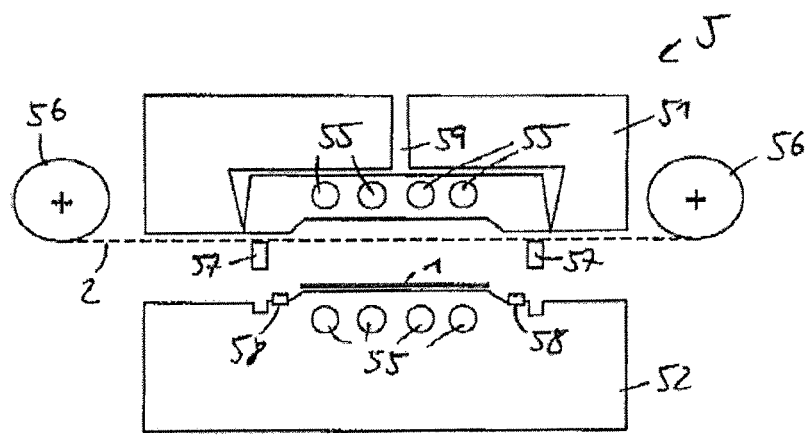

As FIG. 5A shows, the runner 592 can be arranged in the lower mold half 52, in which the base body 1 is inserted. Alternatively, as represented in FIG. 5B, the runner 592 can also be arranged in the upper mold half 51, against which the decorative film 2 lies.

In both cases, molten plastic compound is here guided through the runner 592 into a cavity 593 of the mold, where it solidifies in contact with the plastic molded article 3.

Additional structure elements 31 can hereby be realized, which cannot be generated by the forming alone. Furthermore, it is thus possible to overmold edge areas of the base body 1, with the result that protruding plastic fibers can be enclosed by the plastic structure 31. A plastic molded article with particularly smooth edges is hereby provided.

Preferably, PC, PP, TPU, PA or a mixture thereof is used for the injection molding. The choice of the injected plastic is geared in particular to the material of the plastic matrix of the base body. It is expedient if the at least one plastic structure 31 consists of the same plastic as the plastic matrix of the base body 1. Alternatively, a thermoplastic can be used which is suitable to form an adhesive join with at least one of the thermoplastics contained in the base body 1.

A solid join between the plastic structure 31 and the base body 1 can hereby be ensured. In a further alternative, it can prove to be advantageous if the plastic structure 31 is produced with at least two plastics, preferably thermoplastics, by means of injection-molding processes by combining the above-named techniques, back-injection molding, injection and overmolding, for example to realize a different coloring of particular areas of the plastic molded article 3 or to integrate additional sealing elements on the plastic molded article 3.

It is preferred if the injection molding is effected at a temperature in the range of from 200° C. to 320° C., preferably in the range of from 240° C. to 290° C., further preferably in the range of from 240° C. to 270° C. Furthermore, it is advantageous if the injection molding is effected at a pressure in the range of from 10 bar to 2000 bar, preferably in the range of from 200 bar to 1500 bar, further preferably in the range of from 500 bar to 1300 bar.

Pressure and temperature of the injection-molding process are geared to the type of plastic compound used, as well as the geometry of the plastic structure 31 to be generated.

It is furthermore preferred if the plastic molded article 3, after the forming and/or after the injection molding, is cooled to a temperature in the range of from 150° C. to 0° C., in particular with a cooling rate of from 1 K/s to 30 K/s.

A controlled solidification of the injected plastic structure 31 or of the entire plastic molded article 3 is hereby achieved, with the result that distortions or the like during cooling are prevented.

Furthermore, it is preferred if the material of the at least one plastic structure 31 contains additives, in particular glass, carbon or natural fibers, copper, aluminum oxide, graphite, agents for improving flowability, UV stabilizers, flame retardants, foamers, agents for dissipating static charge or for forming electrical conductivity pathways. Such additives can give the plastic structure 31 additional visual, mechanical, chemical or functional properties.

Furthermore, it is expedient if the material of the at least one plastic structure 31 comprises colorants, in particular multi-colored or achromatic pigments and/or effect pigments, thin-film layer systems, cholesteric liquid crystals, dyes and/or metallic or non-metallic nanoparticles. The plastic structure 31 can thus also be optically adapted to the design of the remaining plastic molded article 3.

It is further preferred if the at least one plastic structure 31 surrounds an edge area of the base body 1. Protruding fibers of the base body 1 can hereby be enclosed in the plastic structure 31, with the result that a smooth, optically and tactilely appealing edge of the plastic molded article 3 results.

Furthermore, it is preferred if the at least one plastic structure 31 comprises reinforcing elements, in particular ribbed bodies or domes, and/or securing elements, in particular clips, locking hooks, snap hooks, brackets, screw openings, locking openings, springs, grooves or the like.

This makes it possible to join the plastic molded article 3 to further components, without separate securing means being necessary, and/or further contributes to the mechanical stabilization of the plastic molded article 3.

After the cooling of the injected plastic structure 31, the finished plastic molded article 3 is finally demolded. In order to facilitate a problem-free demolding, it is expedient if drafts of the mold 5 in the area of the forming surfaces 53, 54 have an angle of more than 2°. It is also expedient if inside radii of the mold 5 in the area of the forming surfaces 53, 54 are greater than a thickness of the base body. Furthermore, the outside radii of the mold 5 in the area of the forming surfaces 53, 54 are preferably greater than the sum of the inside radii of the mold 5 in the area of the forming surfaces 53, 54 and the thickness of the base body 1.

It is likewise advantageous if the drafts of the mold 5 in the area of the cavity 593 have an angle of more than 0.5°.

These geometric parameters make a problem-free demolding of the finished plastic molded article possible.

Figure 6:
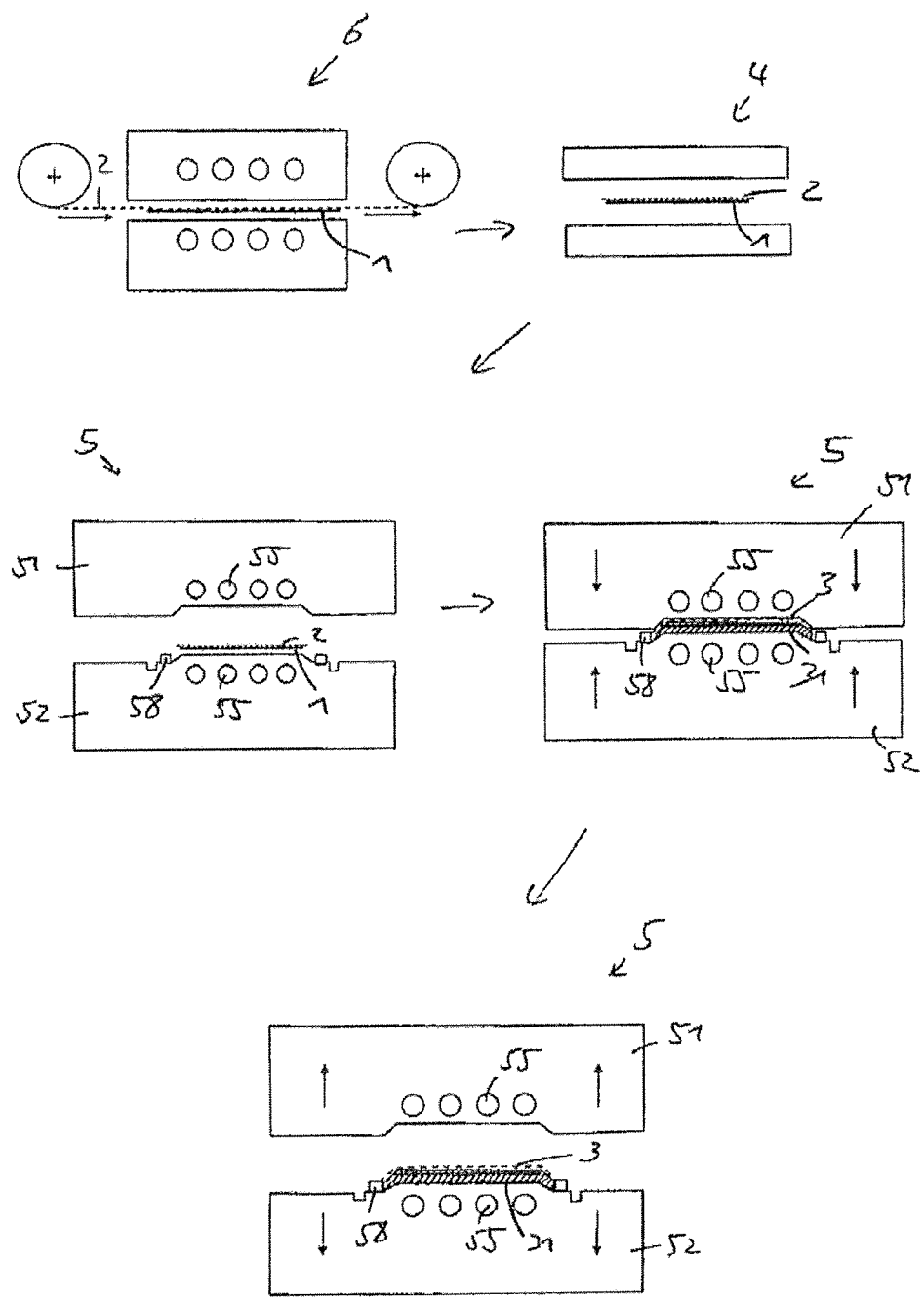
FIG. 6 a schematic representation of the method steps of an alternative embodiment example of a method for producing a plastic molded article.
Figure 7:
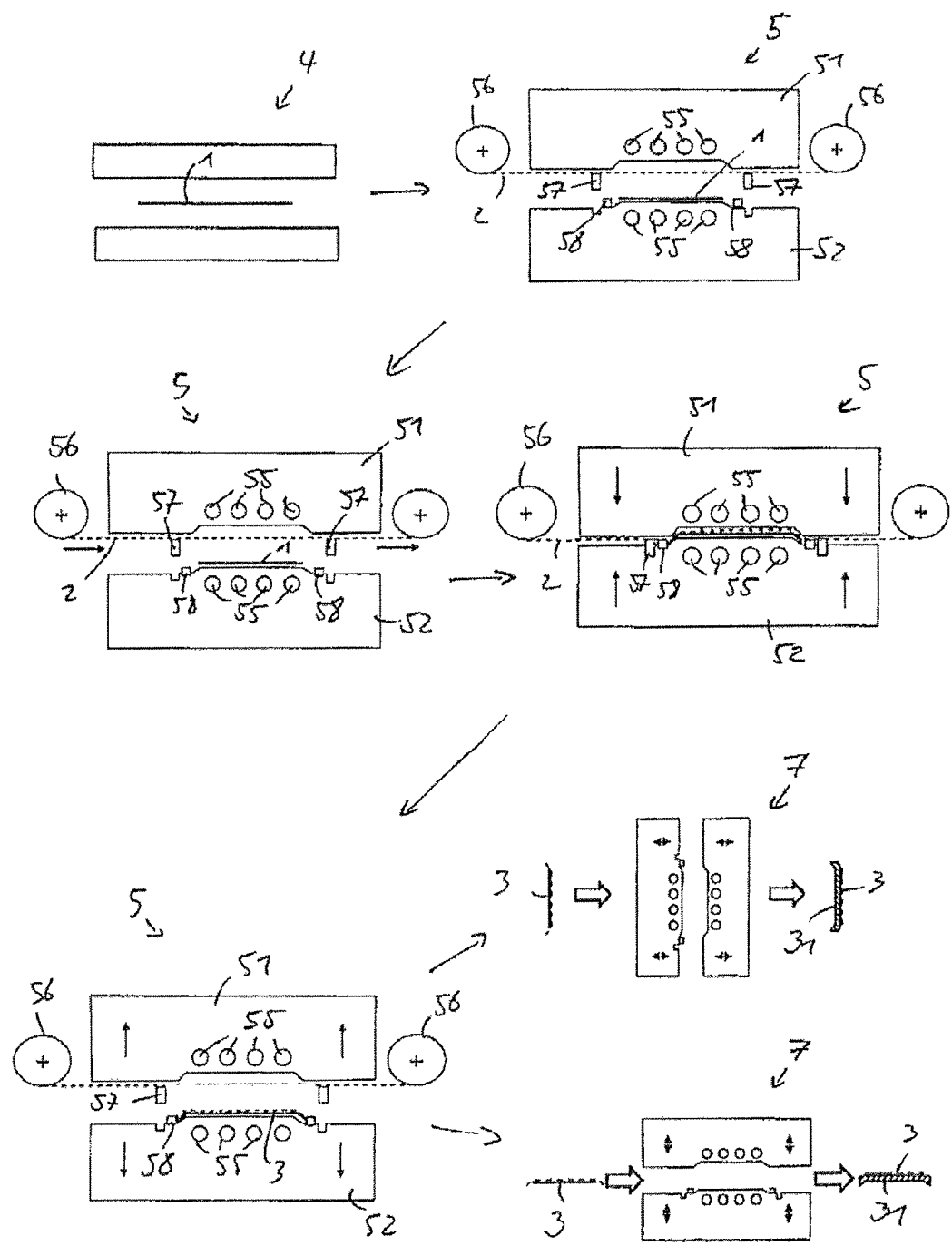
FIG. 7 a schematic representation of the method steps of a further alternative embodiment example of a method for producing a plastic molded article.

In FIGS. 6 and 7, two alternative embodiment examples of a method for producing a plastic molded article 3 are represented.

The embodiment example according to FIG. 6 differs from the above-explained embodiment example merely in that the decorative film 2 is already joined to the base body 1 before the forming in a separate mold 6. This can be effected in particular by roll-to-roll embossing, calendering or compression molding.

This is advantageous in particular if the decorative film 2 is first die-cut to the desired shape. If the application of the decorative film 2 to the base body 1 is effected before the heating, then the heating step can additionally be utilized to produce a solid join between the decorative film 2 and the base body 1. In the case of a decorative film 2 previously fixed in such a way, separate holding elements for the decorative film 2 in the mold 5 can then be dispensed with, with the result that the handling of decorative film 2 and base body 1 is made easier.

The embodiment example according to FIG. 7 differs from the embodiment example according to FIG. 4 only in that the injection molding of the plastic structure 31 is not effected in the mold 5. Instead, the formed plastic molded article 3 is removed from the mold 5 and transferred into a separate injection mold 7, where the plastic structure 31 is injected in the described manner. This can be a horizontal or a vertical mold.

LIST OF REFERENCE NUMBERS

1 base body
2 decorative film
21 carrier ply
22 detachment layer
23 protective layer
24 decorative ply
25 adhesive layer
3 plastic molded article
31 plastic structure
4 heating device
5 mold
51 mold half
52 mold half
53 forming surface
54 forming surface
55 temperature-control channel
56 conveyor
57 clamping device
58 seal
59 runner system
591 element
592 runner
593 cavity
6 mold
7 injection mold

The invention claimed is:

1. A method for producing a plastic molded article with the steps:
   a) providing at least one base body made of a fiber composite plastic, wherein the fiber composite plastic comprises at least one sheet material ply made of continuous fibers and a plastic material impregnating the at least one sheet material ply, the base body being provided as a semi-finished product in sheet form having some of the continuous fibers of the at least one sheet material ply protruding beyond the plastic impregnation;
   b) providing at least one decorative film;
   c) heating the at least one base body;
   d) joining at least one area of the at least one base body to the at least one decorative film in a mold, wherein a forming of the base body with the at least one decorative film in the mold is provided;
   e) detaching a carrier ply from the at least one decorative film after the forming; and
   f) injection molding at least one plastic structure onto the formed base body in the mold, whereby the plastic structure is molded around an edge area of the base body such that any of the protruding continuous fibers of the base body are enclosed by the plastic structure, and wherein the plastic structure comprises reinforcing elements, colorants and/or pigments.

2. The method according to claim 1, wherein the at least one decorative film is provided as roll goods.

3. The method according to claim 2, wherein the at least one decorative film is die-cut or cut before the forming.

4. The method according to claim 2, wherein the at least one decorative film is die-cut in the mold.

5. The method according to claim 1, wherein the base body is heated by infrared irradiation, contact heating, in a convection oven or inside the mold.

6. The method according to claim 1, wherein the base body is heated to a temperature which is 0° C. to 100° C. higher than a melting point or a glass-transition temperature of a plastic matrix of the fiber composite plastic.

7. The method according to claim 1, wherein the base body is heated to a temperature of from 100° C. to 300° C.

8. The method according to claim 1, wherein the base body and the at least one decorative film are formed by hydraulic, pneumatic or electrical application of pressure between two halves of the mold.

9. The method according to claim 1, wherein the mold is temperature-controlled.

10. The method according to claim 1, wherein the mold is heated isothermally to a temperature of from 40° C. to 180° C.

11. The method according to claim 1, wherein the mold is temperature-controlled variothermally, with a temperature control between 0K and 250K below the melting temperature of a polymer used, with a heating or cooling gradient of from 1K/s to 30K/s.

12. The method according to claim 1, wherein the at least one decorative film is positioned in the mold with the aid of registration marks and/or stamped marks.

13. The method according to claim 1, wherein the base body and/or the at least one decorative film are fixed in the mold by clamping devices and/or vacuum.

14. The method according to claim 1, wherein, during the forming, a surface structure is introduced into the base body and/or into the plastic structure and/or into the at least one decorative film at least in areas.

15. The method according to claim 1, wherein the molding is effected at a temperature of from 200° C. to 320° C.

16. The method according to claim 1, wherein the molding is effected at a pressure of from 10 bar to 2000 bar.

17. The method according to claim 1, wherein the plastic molded article, after the forming and/or injection molding, is cooled to a temperature of from 150° C. to 0° C., with a cooling rate of from 1K/s to 30K/s.

18. The method according to claim 1, wherein a at least one decorative film with a carrier ply made of PET with a thickness of from 5 µm to 250 µm is used.

* * * * *